(12) United States Patent
Eisenhardt et al.

(10) Patent No.: US 10,376,971 B2
(45) Date of Patent: Aug. 13, 2019

(54) PIPE MILLING MACHINE—DIRECTIONAL STABILITY

(71) Applicant: C. & E. Fein GmbH, Schwaebisch Gmuend (DE)

(72) Inventors: Armin Eisenhardt, Bisingen (DE); Boris Richt, Hemmingen (DE); Jonas Buck, Geislingen/Weiler (DE)

(73) Assignee: C. & E. Fein GmbH, Schwaebisch Gmuend (DE)

( * ) Notice: Subject to any disclaimer, the term of this patent is extended or adjusted under 35 U.S.C. 154(b) by 0 days.

(21) Appl. No.: 15/585,803

(22) Filed: May 3, 2017

(65) Prior Publication Data

US 2017/0320148 A1  Nov. 9, 2017

(30) Foreign Application Priority Data

May 3, 2016 (DE) .................. 10 2016 108 220

(51) Int. Cl.
*B23D 45/12* (2006.01)
*B23D 21/04* (2006.01)

(52) U.S. Cl.
CPC ........... *B23D 45/126* (2013.01); *B23D 21/04* (2013.01)

(58) Field of Classification Search
CPC ....... B23D 45/126; B23D 21/04; Y10T 82/22; Y10T 82/16442; Y10T 82/16475; Y10T 83/667; Y10T 83/674; Y10T 83/68; Y10T 409/30644; Y10T 409/306384; B23B 5/163; B26D 3/16; B26D 3/166; B26D 7/0006; B26D 2007/013; B23Q 9/0057; B23Q 9/0042; B23Q 9/0021; B23C 3/12; B23C 3/122

USPC ...................................... 30/94–97, 100, 101
See application file for complete search history.

(56) References Cited

U.S. PATENT DOCUMENTS

| 2,291,395 | A | * | 7/1942 | Levey | .................. | B23D 45/126 |
| | | | | | | 266/56 |
| 3,688,615 | A | | 9/1972 | Protze et al. | | |
| 4,490,909 | A | | 1/1985 | Wachs et al. | | |

(Continued)

FOREIGN PATENT DOCUMENTS

| DE | 2009287 C | 4/1972 |
| DE | 20104912 U1 | 6/2001 |
| EP | 0427453 A1 | 5/1991 |

(Continued)

OTHER PUBLICATIONS

The definition of 'sprocket' accssed at https://merriam-webster.com/dictionary/sprocket on Nov. 27, 2018.*

(Continued)

*Primary Examiner* — Evan H MacFarlane
(74) *Attorney, Agent, or Firm* — Muncy, Geissler, Olds & Lowe, P.C.

(57) ABSTRACT

A pipe milling machine for separating and/or cutting a pipe to length includes a drive unit configured to generate a feed force to the pipe and a holding device configured to hold the pipe. The holding device is mountable around the pipe, the drive unit engages in or touches down on the holding device, the feed force is transferred to the holding device in a location, which contacts the pipe or which is adjacent to a location which contacts the pipe, and/or the drive unit is guided by the holding device.

4 Claims, 4 Drawing Sheets

(56) References Cited

U.S. PATENT DOCUMENTS 5,159,756 A * 11/1992 McGuire ................ F16L 41/06
30/92

FOREIGN PATENT DOCUMENTS

| | | | |
|---|---|---|---|
| JP | S 56-62714 A | * | 5/1981 |
| JP | S5662714 A | | 5/1981 |
| JP | H03228514 A | | 10/1991 |
| JP | 2015100872 A | | 6/2015 |
| RU | 2140343 C1 | | 10/1999 |
| RU | 2152851 C1 | | 7/2000 |
| SU | 131737 A1 | | 11/1960 |
| SU | 548385 A1 | | 2/1977 |

OTHER PUBLICATIONS

Office Action issued by the Eurasian Patent Office in corresponding Russian application 201790770.

* cited by examiner

PIPE MILLING MACHINE—DIRECTIONAL STABILITY

CROSS-REFERENCE TO RELATED APPLICATIONS

This application claims the priority of German patent application 10 2016 108 220.1, filed on May 3, 2016, and entitled "Pipe Milling Machine—Directional Stability", which application is incorporated herein by reference in its entirety.

TECHNICAL FIELD

The present invention relates to a pipe milling machine for separating and/or cutting a pipe to length, in particular an oil or gas pipeline, and a system for separating and/or cutting to a pipe to length.

BACKGROUND

In the prior art pipe milling machines for cutting to length and/or separating already-laid pipes, in particular pipes of a pipeline, are known.

SUMMARY

The pipe milling machines in the prior art can be mounted by means of separable roller chains to the pipe which is to be processed. It would be advantageous, if the application of force were done to a section of a chain or a band which lies flat against the pipe or at least is adjacent to a location lying flat against the pipe. A more stable mounting of the pipe milling machine would result. This would ensure correct directional stability of the pipe milling machine. In particular, clean, straight cuts would result from this, which would ensure further processing.

Embodiments of the present invention provide a pipe milling machine in such a way, that the chain section, on which a force acts, lies flat against the pipe.

In a first embodiment of the invention, a pipe milling machine for separating and/or cutting a pipe to length, in particular an oil or gas pipeline, is provided. The pipe milling machine comprises first means (or drive unit) for generating a feed force and second means (or holding device), wherein the second means is arranged around the pipe, wherein the first means for generating a feed force engages in or touches down on the second means, wherein the feed force is transferred to the second means in a location, which contacts the pipe or which is adjacent to a location contacting the pipe, and/or wherein the first means is guided by the second means.

Advantageously a combination of two means is chosen in such a way, that an application of force by one means to a second means is done in such a way, that a high static friction of the pipe milling machine with the pipe, which is to be processed, results or wherein the one means results in a forced guidance of the second means.

In a second embodiment of the invention, a system for separating and/or cutting a pipe to length, in particular an oil or gas pipeline, is provided. The system comprises a pipe milling machine and a band or a guiding chain, wherein the band or the guiding chain is mounted to the pipe, and wherein the band or the guiding chain serves to guide the roller or the chainwheel.

According to an exemplary embodiment of the invention, a pipe milling machine is provided, wherein the first means is a roller or a chainwheel.

In a further embodiment according to the invention, a pipe milling machine is provided, wherein the second means is a band or a roller chain or a guiding chain.

By using a roller and a band, an arrangement can be formed in such a way, that the roller runs on the band and/or that the band can be used to guide the roller. For this a groove or an edge is formed by the band, in which and/or along which the roller can run. The freedom of motion along the longitudinal axis of the pipe to be processed is thereby restricted, so that a directional stability of the pipe milling machine is achieved. Alternatively, a chainwheel may run in a guiding chain, by which movement of the pipe milling machine along the longitudinal axis of the pipe is also eliminated. If, additionally, the band and/or the guiding chain is implemented multiple times, static friction is increased. Thereby slipping of the band and/or the guiding chain along the longitudinal axis of the pipe can be eliminated.

According to a further exemplary embodiment of the present invention, a pipe milling machine is provided, wherein the second means is implemented 2-fold, 3-fold, 4-fold, 5-fold or implemented any number of times.

According to an exemplary embodiment of the invention, a pipe milling machine is provided, wherein the second means is redirected within the pipe milling machine.

Redirection of the band and/or guiding chain leads to the roller and/or the chainwheel, the band or the guiding chain being pressed onto the pipe. This results in high static friction between the pipe milling machine and the pipe. In an alternative embodiment the redirection is done outside the pipe milling machine.

In a further embodiment according to the invention a pipe milling machine is provided, wherein the pipe milling machine has a cantilever arm or a guide slide for positioning the first means adjacent to the pipe.

The guide slide can be formed so long, that the roller and/or the chainwheel presses the band or the guiding chain onto the pipe.

According to a further exemplary embodiment of the invention, a system is provided, wherein the system comprises 2, 3, 4, 5 or any number of bands or guiding chains, wherein the roller or the chainwheel is guided between two bands or two guiding chains or wherein a first band or a first guiding chain guides a first roller or a first chainwheel and a second band or a second guiding chain guides a second roller or a second chainwheel.

Embodiments of the invention provide a device in such a way, that exact directional stability of the pipe milling machine is ensured. Advantageously a means for guiding the pipe milling machine is provided therefor. The means may in particular be to make changes in the chain track, to arrange a further guide slide, to arrange tensioning bands on the pipe to be cut or to provide forced tracking by a chain. In particular, an application of a force in a location, in which a guiding means or a chain or a band contacts the pipe, can thereby be achieved. In an alternative embodiment the location of application of force is at least adjacent to the location, in which a guiding chain or a guiding band contacts the pipe.

The individual features can of course be combined with one another, as a result of which, in some cases, advantageous effects, which exceed the sum of individual effects, may result.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
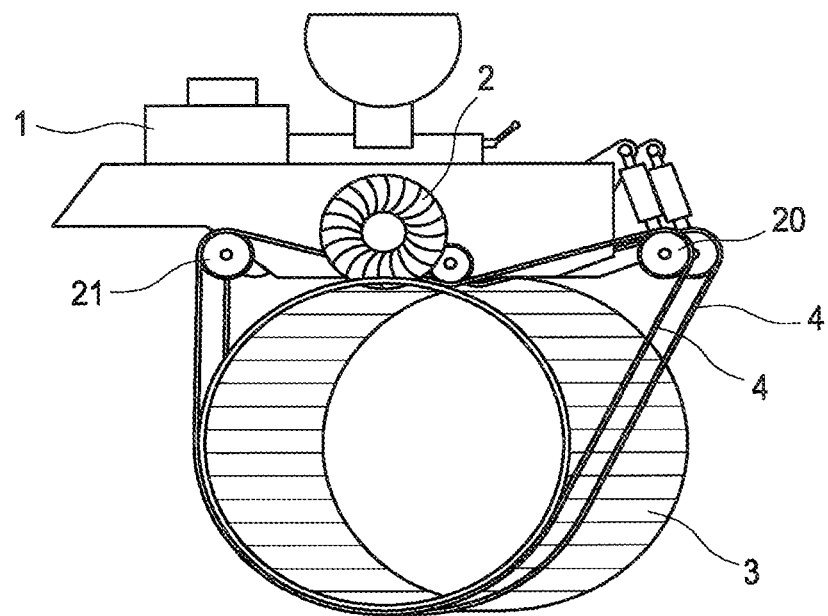
FIG. 1 a pipe milling machine of the prior art.

FIG. 1 shows a pipe milling machine of the prior art having two chains 4, which are placed around a pipe 3 which is to be milled. The chains 4 serve as support of the pipe milling machine and for generating a feed force, by which the pipe milling machine can rotate automatically around the pipe 3. A milling tool/milling wheel 2 is used for cutting through the pipe wall of the pipe 3. After one complete rotation around the pipe 3 separation of the pipe 3 is achieved. In the prior art a guiding force is transferred into the chain 4 and/or the band in a location, which is not in contact with the pipe 3 to be processed. The guiding force is transferred into the chain 4 by chainwheels 20, 21 into the chain 4. The chainwheels 20, 21 are "hanging in the air." Thereby the risk, that a slanted position results, is increased. A correct directional stability cannot be ensured in this way. Unclean, not straight cuts of the pipe 3 may result.

Figure 2:
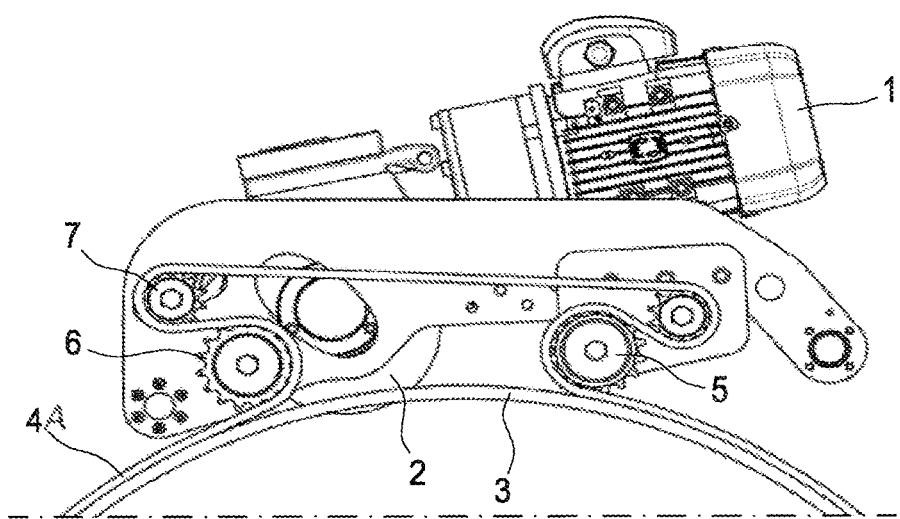
FIG. 2 a first inventive embodiment having a special routing of the chains.

FIG. 2 shows a first inventive embodiment of a pipe milling machine. The pipe milling machine is mounted by means of tensioning chains 4A onto the pipe 3, which is to be processed. The tensioning chains 4A may alternatively be formed as bands. The pipe milling machine is characterized by a special routing of the tensioning chains 4A. The tensioning chains 4A are redirected within the pipe milling machine. Thereby can be ensured, that the chainwheels 5, 6 applying force are contacting the pipe 3. High static friction between the pipe milling machine and the pipe 3 can thereby be achieved. A stable position and clamping of the pipe milling machine results, by which clean, straight cuts of the pipe 3 are ensured. A precise guiding of the pipe milling machine is ensured.

Because of the optimal clamping of the pipe milling machine, even bumps cannot impair the directional stability of the pipe milling machine. An optimal clamping of the chain 4A on the pipe 3 can be achieved by the tensioning unit 7. The tensioning unit 7 may be formed as a further chainwheel, which leads by means of a translational shift to a tensioning of the corresponding chain 4A. Preferably two chains 4A are used, in order to achieve a stable mounting of the pipe milling machine. In an alternative embodiment only one chain or 3, 4 or any number of chain may be used.

Figure 3:
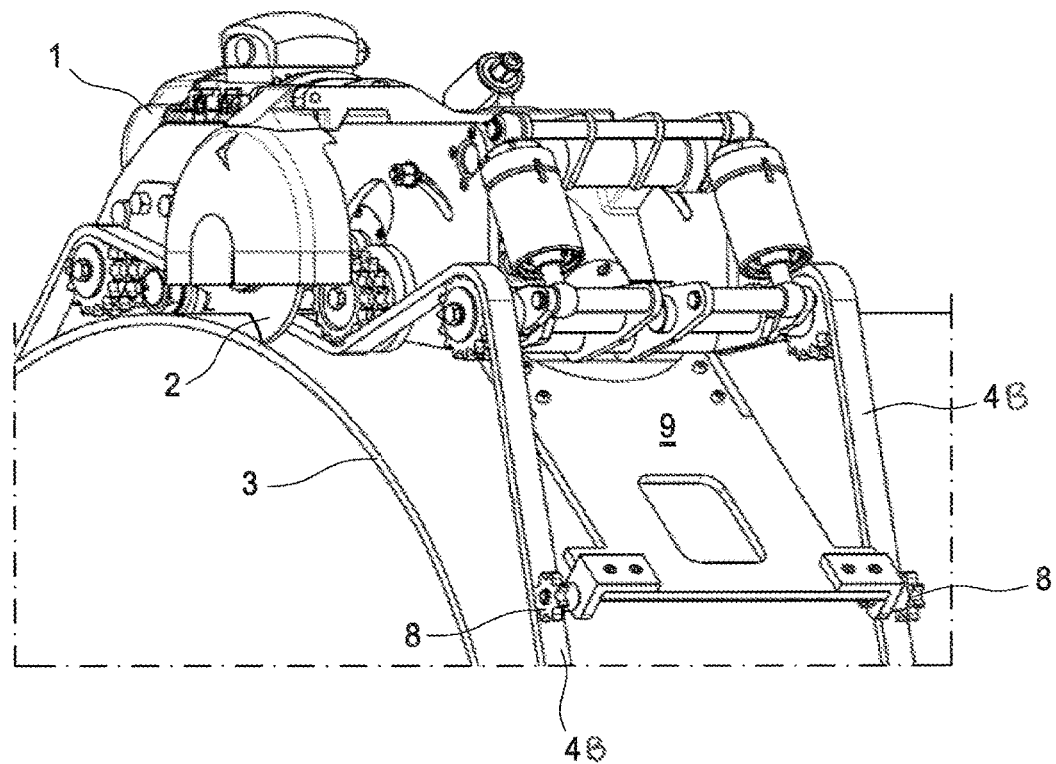
FIG. 3 a second inventive embodiment having a cantilever arm.

FIG. 3 shows a second inventive embodiment of a pipe milling machine having a cantilever arm/guide slide 9. The pipe milling machine is tensioned to the pipe 3 by tensioning chains/tensioning bands 4B. On the guide slide 9 chainwheels 8 are arranged, which engage in the tensioning chain/tensioning bands 4B. The guide slide 9 can be arranged in a manner reaching so far out, that a chain wheel/gear/wheel 8 of the guide slide 9 exerts a force on the pipe 3. This ensures high friction between the chainwheel 8 and/or the band 4B onto the pipe 3. The high static friction leads to an exact directional stability of the pipe milling machine. The chainwheels 8 generate a feed force, by which a movement of the pipe milling machine around the pipe 3 is achieved. In an alternative embodiment the pipe milling machine can be equipped with only one tensioning chain or with three, four, five, six or any number of tensioning chains. By means of a long form of the guide slide 9 a greater lever can be generated, so that even with low force exerted by the chainwheels 8 exact directional stability can be achieved.

Figure 4:
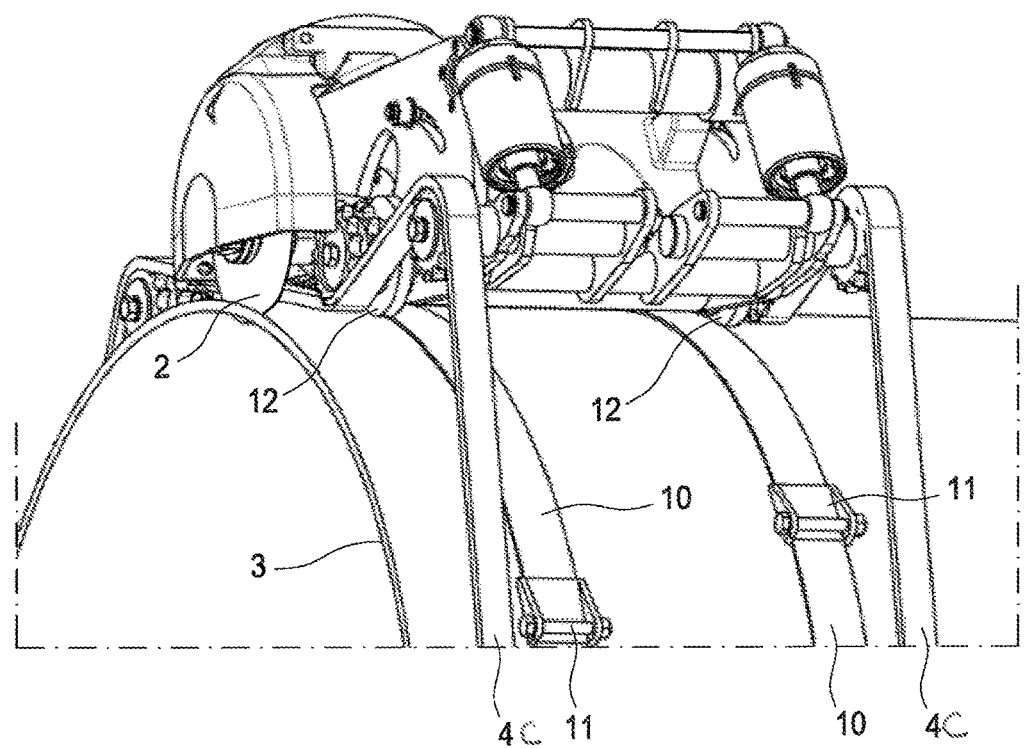
FIG. 4 a third inventive embodiment having tensioning bands.

FIG. 4 shows another alternative embodiment having tensioning bands 10 in addition to tensioning chains/tensioning bands 4C, which can be used for exact guiding of the pipe milling machine. Wheels or rollers 12 in combination with tensioning bands 10 ensure the exact guiding of the pipe milling machine. The tensioning bands 10 in this case act like rails or guides for the wheels of a train. This makes the pipe milling machine have forced tracking. The tensioning bands 10 may in particular be arranged on the inside of the wheels/rollers 12 (with respect to the center of the pipe milling machine). The tensioning bands 10 may be mounted by means of a tension buckle 11 on the pipe 3, which is to be processed. This enables a fast mounting of the tensioning bands 10 on the pipe 3. A requirement for straight, clean separation of the pipe 3 is the exact positioning of the tensioning bands 10. In particular by means of a laser, the positioning of the tensioning bands 10 can be checked and corrected if necessary. The tensioning bands 10 may in particular be made of steel. The bands 10 may form a groove for the rollers 12 or the bands 10 form an edge along each of which a roller 12 may run. Any possibility of movement along the longitudinal axis of the pipe may thus be eliminated or at least reduced.

Figure 5:
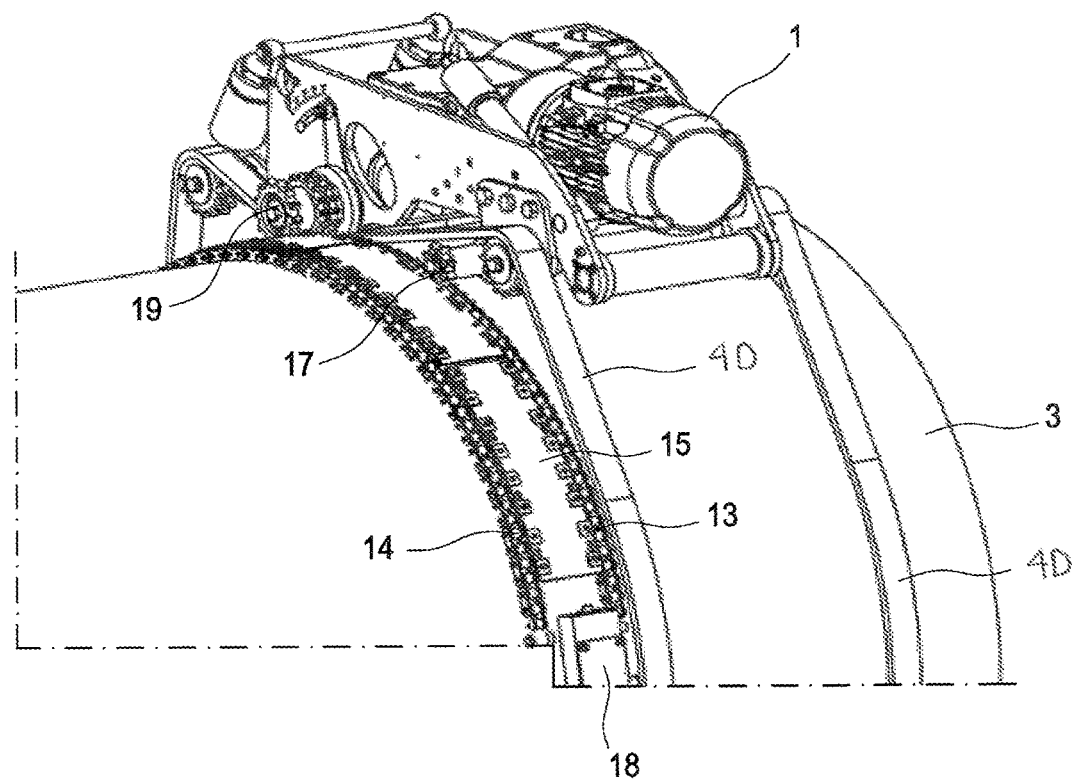
FIG. 5 a fourth inventive embodiment having a chain for forced tracking.

FIG. 5 a further alternative embodiment having roller chains/guiding chains 13, 14, in addition to tensioning chains/tensioning bands 4D, for guiding the pipe milling machine. The guiding chains 13, 14 are tensioned around the circumference of the pipe 3, which is to be processed. The additional guiding chains 13, 14 serve for exact guiding of the pipe milling machine. In particular two guiding chains 13, 14 may be arranged, which are spaced apart from one another by a spacer, in particular a sheet metal spacer 15. The chainwheel 17 has radially-extending protrusions provided around a circumference thereof that directly engage with grooves provided on an upper surface of the guiding chain 13. The upper surface of the guiding chain 13 opposes a bottom surface of the guiding chain 13, the bottom surface directly contacting the pipe 3. By double application of guiding chains 13, 14 a very high stiffness can be achieved. In addition, static friction with the pipe 3 is increased. Thus a clean, straight tracking of the pipe milling machine and with it clean, straight, level cuts can be ensured. The guiding chains 13, 14 may each be held in place on the pipe 3 by tensioning elements 18. Advantageously the tensioning elements 18 are formed such, that the pipe milling machine may run or be guided over by the tensioning elements 18. The guiding chains 13, 14 may be arranged laterally next to the pipe milling machine. In an alternative embodiment only one guiding chain is used.

It should be noted that the term "comprising" does not exclude further elements or process steps, as the term "one" and "a" does not exclude several elements and steps.

The reference numerals used are merely for the purpose of increasing the intelligibility and should in no way be considered as limiting, the scope of the invention being reproduced by the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

LIST OF REFERENCE NUMERALS 1 electric motor
2 cut-off wheel/milling wheel
3 pipe
4 roller chain/tensioning chain/chain
5 gear/chainwheel
6 gear/chainwheel
7 tensioning unit
8 gear/gear/chainwheel
9 cantilever arm/guide slide
10 tension band
11 tension buckle
12 wheel/roller
13 roller chain/guiding chain
14 roller chain/guiding chain
15 spacer/sheet metal spacer
16 tension band
17 chainwheel
18 tensioning element
19 chainwheel

What is claimed is:

1. A pipe milling machine for separating a pipe to length, the pipe milling machine comprising:
first means for generating a feed force;
second means for holding the pipe;
a motor; and
a first tensioning chain or band and a second tensioning chain or band,
wherein the second means is mountable around the pipe,
wherein the first means for generating the feed force engages with the second means,
wherein the feed force is transferred to the second means in a location which contacts the pipe or in a second location which is adjacent to the location which contacts the pipe,
wherein the first means is guided by the second means,
wherein the first means is a chainwheel, the chainwheel having radially-extending protrusions provided around a circumference of the chainwheel,
wherein the second means is a first guiding chain, a bottom surface of the first guiding chain directly contacting the pipe and an upper surface of the first guiding chain, that opposes the bottom surface, is provided with grooves that directly engage with the radially-extending protrusions of the chainwheel,
wherein, in an axial direction of the pipe, the first tensioning chain or band is positioned to a first side of the motor and the second tensioning chain or band is positioned to a second side of the motor and wherein the first guiding chain is positioned adjacent to the second tensioning chain or band, such that the second tensioning chain or band is positioned between the first guiding chain and the motor,
wherein the pipe milling machine further comprises a second guiding chain, the second guiding chain being spaced apart from the first guiding chain by a metal spacer that is positioned entirely between the first guiding chain and the second guiding chain, the metal spacer having a first lateral side and a second lateral side, and
wherein the first guiding chain is connected to the first lateral side of the metal spacer and the second guiding chain is connected to the second lateral side of the metal spacer, such that the bottom surface of the first guiding chain and a bottom surface of the second guiding chain both directly contact the pipe.

2. The pipe milling machine according to claim 1, wherein both the first guiding chain and the second guiding chain are positioned to the second side of the motor, with the first guiding chain being positioned between the second guiding chain and the motor.

3. A pipe milling machine for separating a pipe to length, the pipe milling machine comprising:
a drive unit configured to generate a feed force to the pipe;
a holding device configured to hold the pipe;
a motor; and
a first tensioning chain or band and a second tensioning chain or band,
wherein the holding device is mountable around the pipe,
wherein the drive unit engages with the holding device,
wherein the feed force is transferred to the holding device in a location which contacts the pipe or in a second location which is adjacent to the location which contacts the pipe,
wherein the drive unit is guided by the holding device,
wherein the drive unit is a chainwheel, the chainwheel having radially-extending protrusions provided around a circumference of the chainwheel,
wherein the holding device is a first guiding chain, a bottom surface of the first guiding chain directly contacting the pipe and an upper surface of the first guiding chain, that opposes the bottom surface, is provided with grooves that directly engage with the radially-extending protrusions of the chainwheel,
wherein, in an axial direction of the pipe, the first tensioning chain or band is positioned to a first side of the motor and the second tensioning chain or band is positioned to a second side of the motor and wherein the first guiding chain is positioned adjacent to the second tensioning chain or band, such that the second tensioning chain or band is positioned between the first guiding chain and the motor,
wherein the pipe milling machine further comprises a second guiding chain, the second guiding chain being spaced apart from the first guiding chain by a metal spacer that is positioned entirely between the first guiding chain and the second guiding chain, the metal spacer having a first lateral side and a second lateral side, and
wherein the first guiding chain is connected to the first lateral side of the metal spacer and the second guiding chain is connected to the second lateral side of the metal spacer, such that the bottom surface of the first guiding chain and a bottom surface of the second guiding chain both directly contact the pipe.

4. The pipe milling machine according to claim 3, wherein both the first guiding chain and the second guiding chain are positioned to the second side of the motor, with the first guiding chain being positioned between the second guiding chain and the motor.

* * * * *